(12) United States Patent
Sozzi et al.

(10) Patent No.: US 7,871,650 B2
(45) Date of Patent: Jan. 18, 2011

(54) NON STICKY GUM BASE FOR CHEWING GUM

(75) Inventors: Giuseppe Sozzi, Lainate (IT); Giovanna Del Viscio, Milan (IL)

(73) Assignee: Gum Base Co. SpA, Lainate (MI) (IT)

( * ) Notice: Subject to any disclaimer, the term of this patent is extended or adjusted under 35 U.S.C. 154(b) by 647 days.

(21) Appl. No.: 11/313,896

(22) Filed: Dec. 21, 2005

(65) Prior Publication Data

US 2006/0134267 A1 Jun. 22, 2006

Related U.S. Application Data

(63) Continuation of application No. PCT/EP2004/007569, filed on Jul. 7, 2004.

(30) Foreign Application Priority Data

Jul. 8, 2003 (EP) .................. 03425448

(51) Int. Cl.
 A23G 4/00 (2006.01)
 A23G 4/18 (2006.01)
 B65D 85/02 (2006.01)
(52) U.S. Cl. .................. 426/3; 426/4; 426/5
(58) Field of Classification Search .................. 426/300, 426/5
See application file for complete search history.

(56) References Cited

U.S. PATENT DOCUMENTS

| 4,459,311 | A | | 7/1984 | DeTora et al. |
| 4,588,592 | A | | 5/1986 | Elias |
| 5,236,719 | A | * | 8/1993 | Meyers et al. .................. 426/3 |
| H1241 | H | * | 10/1993 | Synosky et al. ................. 426/3 |
| 5,601,858 | A | | 2/1997 | Mansukhani et al. |
| 6,231,896 | B1 | | 5/2001 | Ford et al. |
| 2003/0124220 | A1 | | 7/2003 | Hill et al. |

FOREIGN PATENT DOCUMENTS

| CN | 1334018 | 2/2002 |
| WO | 9815189 | 4/1998 |
| WO | WO 00/08944 | 2/2000 |

OTHER PUBLICATIONS

International Search Report dated Dec. 6, 2004.

* cited by examiner

*Primary Examiner*—Keith D Hendricks
*Assistant Examiner*—Elizabeth Gwartney
(74) *Attorney, Agent, or Firm*—Katten Muchin Rosenman LLP

(57) ABSTRACT

The present invention relates to a gum base formulation suitable for the production of a chewing gum with good sensory properties and good flavor release in combination with anti-adhesive properties in respect of teeth, dentures and the like typical of formulations containing polyvinyl acetate. This gum base formulation does not stick to teeth and it is characterized by having the following composition by weight:

| | |
|---|---|
| (a) elastomers | 8-16% |
| (b) emulsifiers and/or technological auxiliaries | 18-30% |
| (c) adjuvants | 15-40% |
| (d) vegetable resins and/or vegetable resin esters | 26-45% |
| (e) antioxidants | 0-2% | and by not containing polyvinyl acetate.

15 Claims, No Drawings

NON STICKY GUM BASE FOR CHEWING GUM

CROSS-REFERENCE TO RELATED APPLICATION

This application is a continuation of International Application PCT/EP04/07569 filed on Jul. 7, 2004, now pending and claims priority from European Patent Application 03425448.2, the contents of which are herein wholly incorporated by reference.

The present invention relates to a gum base formulation without polyvinyl acetate suitable for the production of a chewing gum with good sensory properties and good flavour release combined with properties of non-adhesion to hard surfaces including teeth, dentures and the like typical of formulations containing polyvinyl acetate.

STATE OF THE ART

It is known that conventional chewing gum formulations have a well-known tendency to stick not only together but also to any solid surface with which they come into contact.

These formulations comprise synthetic elastomers such as a polyisobutylene, isobutylene-isoprene copolymer, butadiene-styrene copolymer, natural gums such as chicle or jelutong, resins such as vegetable and/or synthesised terpenes and/or glycerol esters of rosin, polyvinyl acetate, microcrystalline waxes, and adjuvant agents, emulsifiers and technological auxilianes.

Once these chewing gums have been chewed and moistened, the entire edible part is dissolved and ingested while the remaining gum part is highly sticky not just to teeth and skin but also to floors, bins and any other dry and hard surfaces.

This adhesion is to due to specific interface forces and depends on the free energy of the surface: adhesion to surfaces is influenced by the wettability of the surface, its surface tension and obviously the nature and conditions of the solid surface, i.e. whether it is rough or smooth.

In the past, additives have been identified to minimise the tackiness of chewing gums.

For instance, U.S. Pat. No. 3,255,018 proposes the use of tannic acid to reduce the adhesiveness of gum bases. As tannic acid is soluble, however, it is rapidly extracted and ingested, returning the original adhesive properties to the gum base; in order, therefore, to prolong and regulate the extraction of the tannic acid, the use of a tannic-acid-based gelatine is disclosed.

U.S. Pat. No. 2,273,425 suggests the use of ethylcellulose, while U.S. Pat. No. 3,285,750 suggests the use of a polyolefin resin containing fluorine. Materials such as sulphides, mineral salts of the type of calcium carbonate, waxes, fats, oils, soaps and starches have also been used with varying degrees of success to reduce adhesion: U.S. Pat. Nos. 2,429,664 and 3,440,060.

However, the use of anti-adhesive agents not only does not guarantee success but often creates many problems; they may have an adverse effect on taste, be costly, cause damage to production lines and, in particular, in some cases, be so soluble as to be rapidly extracted, giving the gum back its properties of tackiness.

A proposed alternative to the inclusion of additives with anti-adhesive properties is to dispose with ingredients normally used in the gum base and in particular to rule out combinations of ingredients such as natural or synthetic gums with resins or waxes and to use increased quantities of polyvinyl acetate, a material which is well known to be non-tacking.

A proposed formulation with reduced tackiness in respect of solid surfaces is disclosed, in particular, in U.S. Pat. No. 3,984,574. This patent discloses a formulation containing 5-35% of an elastomer which may be polyisobutylene, polyisoprene and isobutylene-isoprene copolymer or butadiene-styrene copolymer; 5-50% of hydrogenated or partially hydrogenated vegetable oils or animal fats; 5-40% of adjuvant agents; over 55% of polyvinyl acetate; over 20% of fatty acids and over 10% of mono or diglycerides of fatty acids.

This patent attributes the lack of adhesion of the chewing gum in particular to the total exclusion of some conventional ingredients of the gum base such as the glycerol esters of rosin, natural waxes and gums and indicates certain elastomers, partially or totally hydrogenated vegetable oils or animal fats and adjuvant agents as well as polyvinyl acetate, fatty acids and mono and diglycerides of fatty acids as the ingredients of a non-tacking formulation.

Although this patent is evidently valid, it is clear that a drastic reduction of the type of ingredients that can be used in gum base formulations is undoubtedly limiting for formulators. In practice, if the number of ingredients that can be used is limited, it is less possible effectively to satisfy the various market requirements in terms of chewing properties, use of particular flavours, and the production of different types and formats of finished products.

It is known, in the gum base sector, however, that the use of large quantities of polyvinyl acetate, with a resulting reduction of some ingredients such as rosin esters and microcrystalline waxes, gives the gum non-adhesive properties without precluding the use of other ingredients.

Polyvinyl acetate is a synthetic, hygroscopic homopolymer which, in combination with other ingredients, provides a non-tacking gum base probably because, given its hygroscopic nature, it helps to keep the gum moist, thereby reducing its adhesiveness.

U.S. Pat. No. 4,357,355 relates in particular to a non-tacking bubble gum containing between 20 and 55% of polyvinyl acetate of high molecular weight, 8-20% of an elastomer, 8-30% of a plasticiser, between 5 and 25% of adjuvants, 0-20% of fatty acids and other ingredients. The preparation method disclosed in this patent comprises two-stage processing: the preparation of a semi-finished product formed by an emulsifier derived from glyceryl of the type of glyceryl monostearate, glyceryl triacetate and by polyvinyl acetate in a ratio varying between 5 and 75%, and the subsequent incorporation of all the other ingredients of the gum base into this semi-finished product. The preparation of this semi-finished product allows better dispersion of the polyvinyl acetate into the gum base, providing it with non-adhesive properties.

U.S. Pat. No. 4,518,615 also discloses a chewing gum which does not adhere to teeth, dentures or other dental surfaces with the following composition: 15 to 45% of polyvinyl acetate with a molecular weight of between 15 000 and 30 000, 10 to 30% of an elastomer, 2 to 10% of an emulsifier, 0.5 to 15% of polyethylene with a molecular weight of 2000, between 0.5 and 10% of waxes having a melting point of some 76° C., 10 to 40% of plasticiser and 0 to 5% of adjuvant agents as well as an elastomer solvent chosen from the methyl, glycerol and pentaerythritol esters of rosin and terpenes in quantities of between 2 and 18%.

In the above-mentioned patent, the essential ingredient is the polyvinyl acetate of molecular weight of between 15 000 and 30 000 in quantities varying between 15 and 45% by weight of the base and preferably between 20 and 30%. It is explicitly disclosed that quantities of polyvinyl acetate of less than 15% make the gum base non-homogeneous and cause a non-uniform flavour release, while quantities higher than 45% make the product too plastic. The molecular weight also seems to have a crucial influence, as a polyvinyl acetate with a molecular weight of 15 000 or less in particular gives rise to a product which readily breaks down when chewed.

U.S. Pat. No. 5,437,878 also discloses a chewing gum which has reduced adhesive properties, using a combination of waxes and elastomers. The formulations described in particular contain from 16 to 30% of polyvinyl acetate with a molecular weight of between 7000 and 13 000, from 8 to 18% of polyisobutylene of low molecular weight, from 1 to 4% of polyisobutylene of high molecular weight, from 16 to 35% of adjuvant agents, from 1 to 6% of polyethylene with a mean molecular weight of 2000, from 18 to 30% of fats selected from a group of hydrogenated and/or partially hydrogenated vegetable oils, from 1 to 6% of emulsifiers and from 2 to 10% of microcrystalline waxes, while the use of resins of rosin, methyl, glycerol and pentaerythritol esters of rosin and terpene resins is specifically ruled out since they are responsible, according to the inventor, for detracting from the desired properties of the gum.

U.S. Pat. No. 6,231,896 discloses a chewing gum rubber composition (gum base) that utilizes carnosic acid as an antioxidant stabilizer whereas U.S. Patent application 2003/0124220 discloses a chewing gum rubber composition that utilizes carnosic acid as an antioxidant stabilizer together with lecithin as an emulsifier for the carnosic acid.

BRIEF DESCRIPTION OF THE INVENTION

It has been unexpectedly discovered by the invention that it is possible to formulate soft gum bases with a good flavour release, which do not stick to teeth and/or hard surfaces, which are very similar to high-quality gum bases typically containing significant quantities of polyvinyl acetate and a small content of other resins, without the use of polyvinyl acetate or anti-adhesive agents such as tannic acid, ethylcellulose, or other anti-adhesive materials, without necessarily excluding any class of compounds typically used in the production of the gum base, and even with a content of polyterpene resins and rosin esters greater than the content normally used for non-tacking gums.

The particular feature of these gums lies in the fact that high sensory standards are maintained throughout the chewing profile and excellent anti-adhesive properties are achieved, making it ideal for products in tablet form which are well known to be difficult to produce with tacking gum bases, even though formulated without polyvinyl acetate.

DETAILED DESCRIPTION OF THE INVENTION

The gum base formulated by the present invention represents a well-researched and careful combination of the classes of ingredients conventionally used in the production of the gum base.

The only ingredient that has been intentionally excluded from the formulation is polyvinyl acetate, already widely used for the formulation of non-tacking gums, in order to make the gum base more natural.

The present gum base in particular comprises the following ingredients expressed as percentages by weight with respect to the total weight of the gum base*:

| | |
|---|---|
| (a) elastomers | 5-25% |
| (b) emulsifiers and/or technological auxiliaries | 5-30% |
| (c) adjuvants | 6-50% |
| (d) vegetable resins and/or vegetable resin esters | 20-45% |
| (e) antioxidants | 0-2% |

* i.e. where the percentage sum of the components (a), (b), (c), (d) and (e) is 100.

The percentage of component (a) is preferably between 8 and 16%, the percentage of component (b) between 18 and 30%, the percentage of component (c) between 15 and 40%, the percentage of component (d) between 26 and 41% and the percentage of component (e) between 0 and 2%.

The elastomers which can be used in the composition of the present gum base include all the elastomers normally used in the gum base, whether synthetic such as butadiene-styrene copolymer, polyisobutylene, and isobutylene-isoprene copolymer, or natural such as chicle, jelutong, balata, gutta-percha, lechi caspi, sorva or a combination thereof: among these, polyisobutylene, isobutylene-isoprene copolymer and butadiene-styrene copolymer are preferred.

The emulsifiers and/or technological auxiliaries include glyceryl monostearate, acetylated monoglycerides, hydrogenated coconut, soybean, palm and cottonseed vegetable oils, lecithin and triacetin, which may be used alone or in combination with one another.

The adjuvants include calcium carbonate, magnesium carbonate, talc, tricalcium phosphate and the like, and a combination thereof is also possible.

The resins and/or resin esters of vegetable origin which can be added to this formulation are terpene resins such as polymers of α-pinene, β-pinene or d-limonene, rosin derivatives such as hydrogenated or partially hydrogenated resins, glycerol esters of natural rosin, pentaerythritol esters with natural rosin, glycerol esters with partially hydrogenated natural rosin, pentaerythritol esters with partially hydrogenated natural rosin, methyl esters of hydrogenated rosin, esters of hydrogenated rosin and glycerol, esters of partially dimerised rosin and glycerol, esters of polymerised rosin and glycerol esters of tall oil resin acids, which may be used alone or in combination; polyterpene resins and glycerol esters with hydrogenated or partially hydrogenated natural rosin, or mixtures thereof, are in particular preferred. Even more preferably, component (d) is a combination of terpene resins and rosin esters.

The antioxidants may include those materials conventionally used in the composition of the gum base such as butylated hydroxyanisole, butylated hydroxytoluene, tocopherol, propyl gallate and the like.

Carnosic acid is preferably not used as the antioxidant; more preferably, lecithin is not used as the emulsifier if carnosic acid is used as the antioxidant.

In order to explain the novelty of the invention in further detail, examples of non-adhesive gum base formulations of the present invention are given in Formula 1 and Formula 2, while Formula 3 and Formula 4 are examples of conventional non-tacking formulae containing polyvinyl acetate:

| | Formula 1 | Formula 2 | Formula 3 | Formula 4 |
|---|---|---|---|---|
| Elastomers | 9-16% | 8-14% | 10-18% | 12-16% |
| Emulsifiers and/or technological auxiliaries | 25-30% | 18-25% | 23-28% | 26-32% |

-continued

|  | Formula 1 | Formula 2 | Formula 3 | Formula 4 |
|---|---|---|---|---|
| Adjuvants | 15-22% | 32-40% | 16-22% | 15-23% |
| Terpene resins | 24-28% | 18-24% | — | 3-8% |
| Rosin esters | 9-13% | 8-12% | 12-18% | 12-16% |
| Antioxidants | 0-2% | 0-2% | 0-2% | 0-2% |
| Polyvinyl acetate | — | — | 19-24% | 18-22% |

As can be seen from the preceding table, the gum bases of formulae 1 and 2 differs from those of formulae 3 and 4 in the following respects:
- lack of polyvinyl acetate making the gum base more natural;
- a greater content of terpene resins and rosin esters in the gum bases of formulae 1 and 2 than in those of formulae 3 and 4.

The lack of adhesiveness of the present invention does not depend on the inclusion in the mixture of some specific components or special additives which could be extracted during chewing or which could change the taste and sensory properties of the product, and the anti-adhesive effect is not obtained by excluding classes of compounds normally used in the production of the gum base, but is ensured by the appropriate combination in the formula described of hydrogenated vegetable oils and polyterpene resins which are normally excluded from or used in small quantities in conventional non-tacking formulae.

The gum base as described may be obtained by using one of the techniques known in the art; in particular, the production method may include the preparation of semi-processed products containing elastomers, adjuvants, emulsifiers and the subsequent incorporation of the other ingredients in steam-heated double-wall mixers, single processing in the same mixers or may be obtained by a continuous process.

The versatility of the gum base of the present invention makes it suitable for non-tacking formulations of chewing gum, with or without sugar, which may be produced in different formats: drops, sheets, sticks and dragees and for formulations of chewing gum in compressed tablet form.

This formulation is also suitable for nutritional and pharmaceutical products both as a result of its anti-adhesive properties and its natural nature.

In order to assess the efficiency of the new formulation in comparison with conventional formulae, three unsweetened chewing gum formulations were prepared as described below.

The first formulation comprised a gum base for unsweetened chewing gum of good quality and slightly tacky with respect to the teeth, with polyvinyl acetate as in Formula 5 below, the second formulation comprised a typical non-tacking formulation containing polyvinyl acetate as described above under Formula 4 and the third with the gum base of Formula 1 of the present invention containing resins other than polyvinyl acetate. Formula 5:

| Elastomers | 10-17% |
|---|---|
| Emulsifiers and/or technological auxiliaries | 30-40% |
| Adjuvants | 9-16% |
| Rosin esters | 20-26% |
| Antioxidants | 0-2% |
| Polyvinyl acetate | 10-18%. |

These three gum bases were used in the laboratory to produce chewing gums with the following composition:

| Gum base | 30% |
|---|---|
| Polyalcohols | 67.8% |
| Flavouring | 2% |
| Intensive sweeteners | 0.2%. |

The three samples were chewed by a panel of expert chewers who assessed the tackiness, flavour release and entire sensory profile of the three samples.

The panel noted an obvious difference, as regards the tackiness of the samples with respect to the teeth and paper, between the first product and the other two products, whereas no difference was noted between the non-tacking sample containing polyvinyl acetate and the sample containing resins other than polyvinyl acetate of the present invention.

As further confirmation of the properties of the gum base of the invention, it was decided to assess its behaviour in products in compressed tablet form.

As is known, these products require non-tacking formulations as the method of production of chewing gum in tablet form, during its stages of milling, screening, mixing and in particular compression is very critical. The risk run during the stages of milling, screening and mixing is that of obtaining powders with a coarse and non-homogeneous granular size, with milling also becoming impossible in the worst cases, and in the compression stage the temperature increase of the punches of the compressor machine emphasises the tacking tendency of the powder and often makes compression impossible.

A conventional compressed chewing gum formula is as follows:

| Gum base | 18-30% |
|---|---|
| Sugar or sweeteners | 20-70% |
| Intensive sweeteners | 0.2% |
| Flavouring | 1-2% |
| Anti-caking agents | 0-4%. |

A good non-tacking chewing gum formulation has in particular been obtained by compression of a chewing gum powder with the following composition included in the range of the examples disclosed in European Patent Application 02425209.0 filed on 5 Apr. 2002 in the name of the applicants:

| Gum base of Formula 1 | 30% |
|---|---|
| Polyalcohols | 64.6% |
| Intensive sweeteners | 0.2% |
| Anti-caking agents | 3.8% |
| Liquid flavouring | 1.4%. |

The formulation of gum base 1 described above has no properties of tackiness during the whole process of production of the tablets: the powder obtained after the stages of milling, screening and mixing is fine and comparable and there were no technological problems at the compression stage. The process yields were comparable to equivalent non-tacking formulations containing polyvinyl acetate.

In order to assess adhesiveness during chewing and the sensory properties of the gum base in question, it was decided to use a panel of selected and trained chewers.

The gum base of the invention was used in the production of chewing gum tablets according to the formulation set out above.

The tablets prepared using the method as described were compared by the panel with equivalent formulations of tablets containing polyvinyl acetate and were chewed for 20 minutes so as to ensure that all the edible ingredients of the chewing gum were completely dissolved and removed.

At the end of chewing, the panel found no significant differences with respect to the lack of adhesiveness of the two samples. The two samples were judged not to be significantly different from the point of view of their sensory properties, in particular as regards their adhesion to teeth and dentures and their flavour release.

CONCLUSIONS

The gum base formulations described in this invention do not adhere to teeth, dentures and paper and can be incorporated into any chewing gum composition, in any format with or without sugar, in place of all the non-tacking gum base formulations containing significant quantities of polyvinyl acetate as they have the same sensory properties and the same technological properties.

The invention claimed is:

1. A non-sticky gum base formulation having the following percentage composition by weight:

| | |
|---|---|
| Elastomers | 9-16% |
| Emulsifiers and/or technological auxiliaries | 25-30% |
| Adjuvants | 15-22% |
| Terpene resins | 24-28% |
| Rosin esters | 9-13% |
| Antioxidants | 0-2% | and not containing polyvinyl acetate, and wherein the gum base formulation is for a chewing gum in a compressed tablet form.

2. A non-sticky gum base formulation having the following percentage composition by weight:

| | |
|---|---|
| Elastomers | 8-14% |
| Emulsifiers and/or technological auxiliaries | 18-25% |
| Adjuvants | 32-40% |
| Terpene resins | 18-24% |
| Rosin esters | 8-12% |
| Antioxidants | 0-2% | and not containing polyvinyl acetate, and wherein the gum base formulation is for a chewing gum in a compressed tablet form.

3. A gum base formulation as claimed in claim 1, characterised in that the elastomers are chosen from polyisobutylene, isobutylene-isoprene copolymer, styrene-butadiene copolymer, chicle, jelutong, balata, guttapercha, lechi caspi, sorva or a combination thereof.

4. A gum base formulation as claimed in claim 1, characterised in that the emulsifiers and/or technological auxiliaries are selected from glyceryl monostearate, acetylated monoglycerides, hydrogenated vegetable oils, lecithin, triacetin, or a combination thereof.

5. A gum base formulation as claimed in claim 4, characterised in that the hydrogenated vegetable oils are selected from coconut, soybean, palm and/or cottonseed oil.

6. A gum base formulation as claimed in claim 1, charaterised in that the adjuvant agents are selected from calcium carbonate, talc or magnesium carbonate, tricalcium phosphate, or a combination thereof.

7. A gum base formulation as claimed in claim 1, characterised in that the terpene resins are selected from polymers of α-pinene, β-pinene and/or d-limonene.

8. A gum base formulation as claimed in claim 1, characterised in that the rosin derivatives are selected from hydrogenated or partially hydrogenated resins, glycerol esters of natural resin, pentaerythritol esters with natural resin, glycerol esters with partially hydrogenated natural rosin, pentaethritol esters with partially hydrogenated natural rosin, methyl esters of hydrogenated rosin, esters of hydrogenated rosin and glycerol, esters of partially dimerised rosin and glycerol, esters of polymerised rosin and glycerol esters of tall oil resin acids, or combinations thereof.

9. A gum base formulation as claimed in claim 1, characterised in that the antioxidants are selected from butylated hydroxyanisole, butylated hydroxytoluene, tocopherol, propyl gallate and mixtures thereof.

10. A chewing gum comprising:
a non-sticky gum base formulation having the following percentage composition by weight:

| | |
|---|---|
| Elastomers | 9-16% |
| Emulsifiers and/or technological auxiliaries | 25-30% |
| Adjuvants | 15-22% |
| Terpene resins | 24-28% |
| Rosin esters | 9-13% |
| Antioxidants | 0-2% | and not containing polyvinyl acetate, and wherein the chewing gum is in a compressed tablet form.

11. A chewing gum comprising:
a non-sticky gum base formulation having the following percentage composition by weight:

| | |
|---|---|
| Elastomers | 8-14% |
| Emulsifiers and/or technological auxiliaries | 18-25% |
| Adjuvants | 32-40% |
| Terpene resins | 18-24% |
| Rosin esters | 8-12% |
| Antioxidants | 0-2% | and not containing polyvinyl acetate, and wherein the chewing gum is in a compressed tablet form.

12. The chewing gum of claim 10, wherein the chewing gum has the following percentage of composition by weight

| | |
|---|---|
| the gum base | 18 to 30% |
| sugars or sweeteners | 20 to 70% |
| intensive sweeteners | 0.2% |
| flavoring | 1-2% |
| anti-caking agents | 0-4%. |

13. The chewing gum of claim 10, wherein the chewing gum has the following percentage of composition by weight

| | |
|---|---|
| the gum base | 30% |
| polyalcohols | 64.6% |

-continued

| | |
|---|---|
| intensive sweeteners | 0.2% |
| liquid flavoring | 1.4% |
| anti-caking agents | 3.8%. |

14. The chewing gum of claim 11, wherein the chewing gum has the following percentage of composition by weight

| | |
|---|---|
| the gum base | 18 to 30% |
| sugars or sweeteners | 20 to 70% |
| intensive sweeteners | 0.2% |

-continued

| | |
|---|---|
| flavoring | 1-2% |
| anti-caking agents | 0-4%. |

15. The chewing gum of claim 11, wherein the chewing gum has the following percentage of composition by weight

| | |
|---|---|
| the gum base | 30% |
| polyalcohols | 64.6% |
| intensive sweeteners | 0.2% |
| liquid flavoring | 1.4% |
| anti-caking agents | 3.8%. |

* * * * *